United States Patent [19]

Funahashi

[11] Patent Number: 5,308,289

[45] Date of Patent: May 3, 1994

[54] DAMPER PULLEY

[75] Inventor: Nobuaki Funahashi, Inazawa, Japan

[73] Assignee: Toyoda Gosei Co., Ltd., Nishikasugai, Japan

[21] Appl. No.: 921,575

[22] Filed: Jul. 30, 1992

[30] Foreign Application Priority Data

Aug. 9, 1991 [JP] Japan .................. 3-225187

[51] Int. Cl.$^5$ .................. F16D 3/00; F16H 35/14
[52] U.S. Cl. .................. 474/94; 474/161; 474/903; 74/574; 74/604; 188/379; 464/180
[58] Field of Search .................. 474/94, 112, 161, 166, 474/903; 74/573 R, 574, 604; 188/378-380; 464/180; 384/417

[56] References Cited

U.S. PATENT DOCUMENTS

| | | | |
|---|---|---|---|
| 1,916,084 | 6/1933 | Vincent | 74/604 X |
| 2,198,787 | 4/1940 | Nystrom | 474/94 X |
| 4,710,152 | 12/1987 | Ichikawa et al. | 474/166 |
| 4,717,370 | 1/1988 | Rohrig | 474/161 |
| 4,781,659 | 11/1988 | Gebhardt | 474/903 X |
| 4,794,816 | 1/1989 | Serizawa et al. | 474/166 X |
| 4,815,332 | 3/1989 | Serizawa et al. | 74/573 R |
| 4,881,426 | 11/1989 | Serizawa et al. | 74/574 |
| 4,943,263 | 7/1990 | Zyogahara et al. | 188/379 X |
| 5,024,120 | 6/1991 | Andra | 74/574 |
| 5,036,726 | 8/1991 | Wolf et al. | 74/574 |
| 5,139,120 | 8/1992 | Gomi | 74/574 X |

*Primary Examiner*—Ramon S. Britts
*Assistant Examiner*—Roger J. Schoeppel
*Attorney, Agent, or Firm*—Cushman, Darby & Cushman

[57] ABSTRACT

The disclosure relates to a damper pulley that exhibits a good damping effect and has a preferable resonance ratio. An annular damper-mass member is joined to an annular surface of a plate portion of a pulley through a first resilient rubber member. Two fan-like concave portions are formed in the surface of the annular damper-mass member, which faces the annular surface of the plate portion, at symmetrical positions with respect to the center of rotation of the pulley. Two projections are formed on the annular surface of the plate portion so as to perpendicularly project into the fan-like concave portions. A second resilient rubber member is interposed between each concave portion and projection. When torsional vibrations are exerted, each second resilient rubber member produces compression deformation, thereby generating a large spring force, whereby the resonance frequency against the torsional vibrations sufficiently increases even when the inertia moment of the mass member is increased. By setting the line connecting the projections with each other nearly into agreement with the direction in which the bending vibrations are exerted, each second resilient rubber member as well as the first resilient rubber member produces shear deformation to generate a small spring force, whereby the resonance frequency against the bending vibrations decreases.

4 Claims, 3 Drawing Sheets

DAMPER PULLEY

BACKGROUND OF THE INVENTION

1. Field of the Invention:

The present invention relates to a damper pulley, and more particularly to a damper pulley for restraining both exerted bending and torsional vibrations.

2. Description of Related Art:

A damper pulley is generally provided with a pulley having a boss portion and a plate portion formed around the boss portion, and a dynamic damper having a resilient rubber member and a damper-mass member which is joined to the plate portion of the pulley through the resilient rubber member.

One example of such a damper pulley is illustrated in FIG. 3. In the drawing, a pulley 1 is composed of a boss portion 11 which is secured to a crankshaft (not shown), a plate portion 12 that projects radially outwardly from the boss portion 11, and a belt retaining portion 13 which is integrally formed with the outer periphery of the plate portion 12 for retaining a belt along the outer surface thereof.

An annular resilient rubber member 21 having a predetermined thickness is provided around the boss portion 11 on an annular surface 12a of the plate portion 12. An annular metallic damper-mass member 22 is joined to the resilient rubber member 21, thereby composing a dynamic damper 2.

When bending vibrations are exerted from the crankshaft, the pulley 1 vibrates in the radial direction thereof so that the resilient rubber member 21 radially deforms. Due to this deformation of the resilient rubber member 21, the dynamic damper 2 resonates with the pulley 1 with a resonance frequency FR which is determined by the radial deformation of the resilient rubber member 21 and the mass of the damper-mass member 22. Thus the bending vibrations are restrained.

When torsional vibrations are exerted from the crankshaft, the pulley 1 vibrates in the circumferential direction thereof so that the resilient rubber member 21 circumferentially deforms. Due to this deformation of the resilient rubber member 21, the dynamic damper 2 resonates with the pulley 1 with a resonance frequency $F\Theta$ which is determined by the circumferential deformation of the resilient rubber member 21 and the moment of the inertia of the damper-mass member 22. Thus, the torsional vibrations are restrained.

In order to sufficiently restrain both the bending vibrations and torsional vibrations of the crankshaft, it is preferable to set the resonance ratio ($FR/F\Theta$) to about 0.7. To achieve this ratio, the moment of the inertia of the damper-mass member 22 has been reduced by tapering the outer surface of the damper-mass member 22, as shown in FIG. 3.

As the moment of inertia decreases, the resonance frequency $F\Theta$ acting against the torsional vibrations increases, but, the damping effect of the dynamic damper 2 is reduced. Therefore, in order to prevent such a reduction in the damping effect of the dynamic damper 2, the prior art has not decreased the resonance ratio of the conventional damper pulley to more than about 0.88.

SUMMARY OF THE INVENTION

It is an object of the present invention to provide a damper pulley which exhibits a sufficiently small resonance ratio without reducing the damping effect of the dynamic damper.

The damper pulley in accordance with the present invention includes a pulley having a boss portion and a plate portion formed around the boss portion, and a dynamic damper having a damper-mass member with a shape corresponding to at least a partial concentric circle having a center of rotation common with the pulley, and a first resilient rubber member for joining the damper-mass member to an annular surface of the plate portion. The damper-mass member has at least two upright surfaces which are symmetrical with respect to the center of rotation of the pulley, and are perpendicular to the annular surface of the plate portion. The pulley has at least two projections which perpendicularly project from the annular surface of the plate portion thereof. A side surface of each of the at least two projections, which faces circumferentially of the plate portion, is opposed to each of the at least two upright surfaces of the damper-mass member. A second resilient rubber member having a predetermined thickness is interposed between the side surface and each upright surface.

When bending vibrations are exerted from the crankshaft, the pulley vibrates in the radial direction thereof so that the resilient rubber member radially deforms. Due to this deformation of the resilient rubber member, the dynamic damper resonates with the pulley with a resonance frequency FR which is determined by the radial deformation of the resilient rubber member and the mass of the damper-mass member, whereby the bending vibrations are restrained.

When torsional vibrations are exerted to the damper pulley having the above-described structure, the pulley vibrates in the circumferential direction thereof so that the second resilient rubber member interposed between the side surface of each projection of the pulley and the upright surface of the mass member produces a compression deformation. Due to this compression deformation of the second resilient rubber member, the spring force decreases, and accordingly the resonance frequency $F\Theta$ against the torsional vibrations becomes sufficiently high, even if a high moment of inertia of the damper-mass member is maintained.

By aligning the symmetrical upright surfaces of the damper-mass member with each other, thus bringing the damper-mass member into near agreement with the direction in which bending vibrations are exerted, both the first resilient rubber member and second resilient rubber member are deformed due to the bending vibrations. As a result, the spring force becomes small, and accordingly the resonance frequency FR against the bending vibrations decreases.

Thus, the preferable resonance ratio $FR/F\Theta$ is obtained without any reduction in the damping effect of the dynamic damper.

Other objects, features and characteristics of the present invention will become apparent upon consideration of the following description and the appended claims with reference to the accompanying drawings, all of which form a part of this specification.

DETAILED DESCRIPTION OF THE PRESENTLY PREFERRED EXEMPLARY EMBODIMENTS

Figure 2:
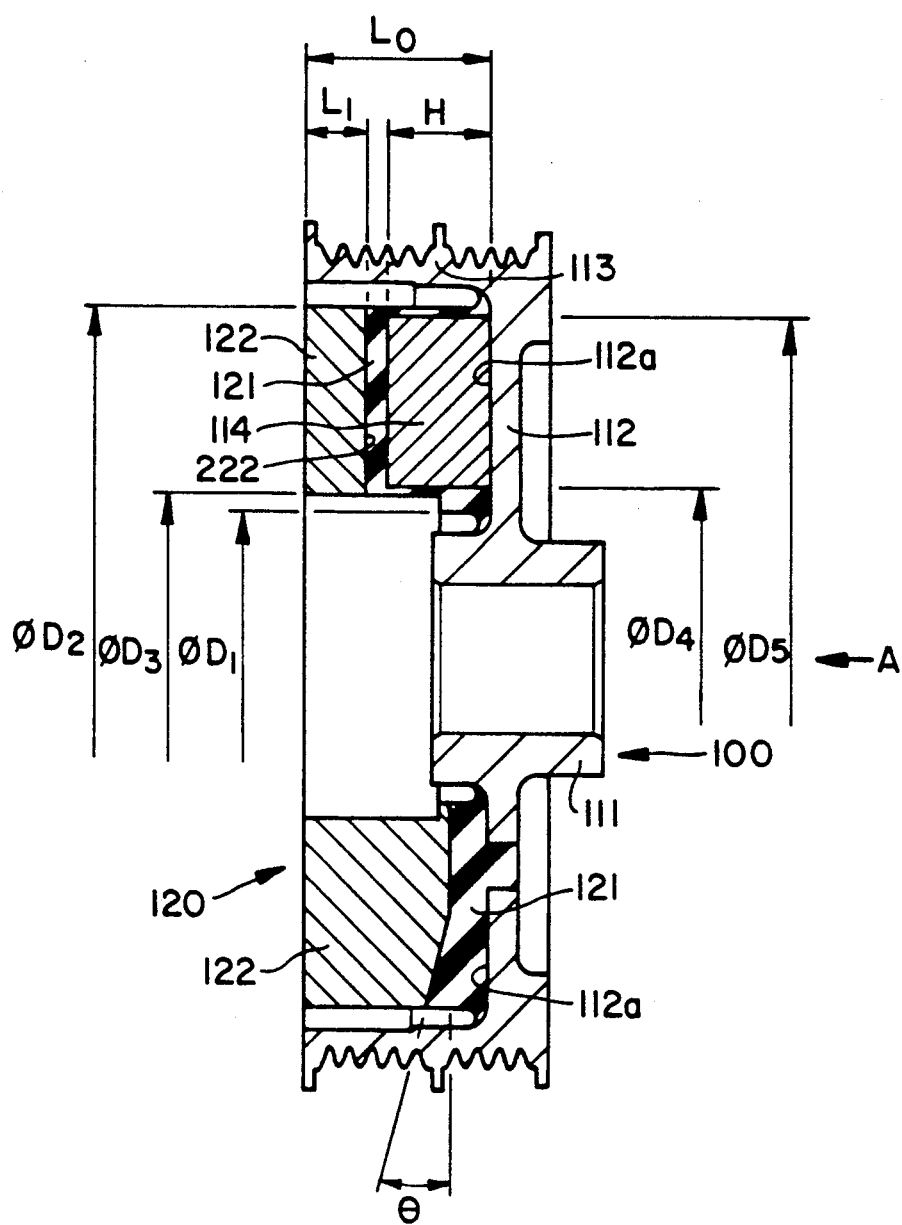
FIG. 2 is a longitudinal sectional view of a damper pulley in accordance with the present invention, which is taken along the line II—II of FIG. 1.

In FIG. 2, a pulley 110 is composed of a boss portion 111 located at a center thereof, and a plate portion 112 connecting the boss portion 111 with a belt retaining portion 113. An annular metallic damper-mass member 122 is disposed so as to face an annular surface 112a of the plate portion 112 with a predetermined spacing. The damper-mass member 122 is joined to the annular surface 112a through a resilient rubber member 121 of a predetermined thickness, thereby composing a dynamic damper 120.

The damper-mass member 122 has two concave portions 222 disposed at positions that are symmetrical with respect to the center of rotation of the pulley in the surface facing the annular surface 112a. Each of the two concave portions 222 has a fan-like shape which fans out from the center of rotation of the pulley by an angle $\Theta 1$, and faces the annular surface 112a with the spacing larger than the predetermined spacing. Circumferentially facing surfaces which define each concave portion 222 are respectively located along radial lines that branch out from the center of rotation of the pulley 100, and these surfaces include upright surfaces 122a, 122b, or 122c, 122d which are all perpendicular to the annular surface 112a of the plate portion 112, as shown in FIG. 1.

Figure 1:
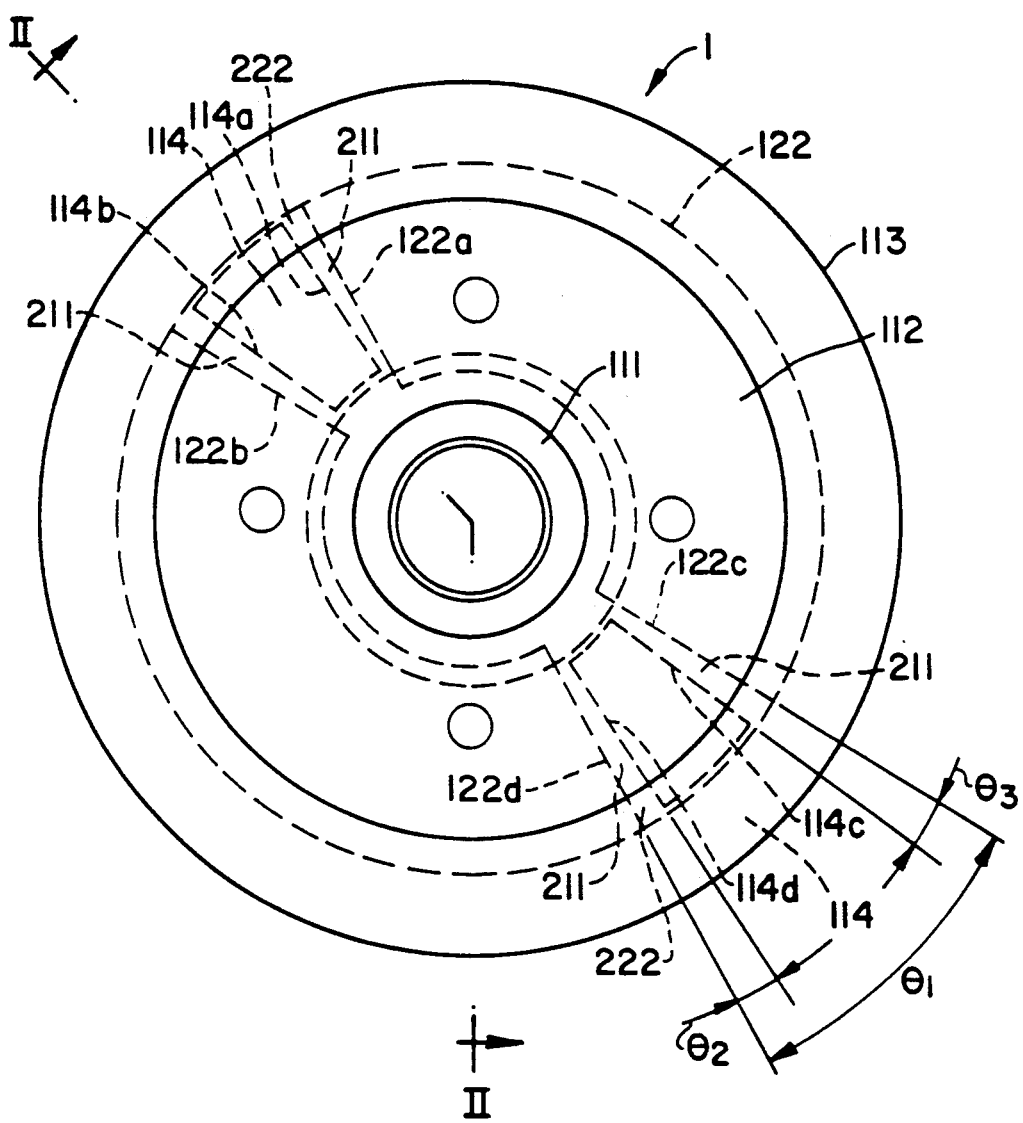
FIG. 1 is a rear elevation of damper pulley in accordance with the present invention in the direction of arrow A in FIG. 2.

As shown in FIGS. 1 and 2, the annular surface 112 of the plate portion 112a is provided with two projections 114 that are symmetrical with respect to the center of rotation of the pulley and perpendicularly project therefrom into the concave portions 222, respectively. Each projection 114 has a fan-like shape similar to the shape of the respective concave portions 222. Side surfaces 114a, 114b, 114c and 114d of the projections 114 are respectively disposed along radial lines branching from the center of rotation of the pulley 100, and the side surfaces 114a and 114d face the upright surfaces 122a and 122d with a an angular spacing of $\Theta 2$ therebetween while the side surfaces 114b and 114c face the upright surfaces 122b and 122c with an angular spacing of $\Theta 3$ therebetween.

Resilient rubber members 211, integrally formed with the resilient rubber members 121 are disposed in the spaces between and joined to the side surfaces 114a, 114b, 114c, 114d and the upright surfaces 122a, 122b, 122c, 122d, respectively.

Each of the resilient rubber members 211 has a thickness that gradually increases from the inner periphery to the outer periphery thereof.

When bending vibrations are exerted from the crankshaft (not shown) to the damper pulley having the above-described structure, the pulley 1 vibrates in the radial direction thereof. Accordingly, the resilient rubber member 121 radially deforms, and the dynamic damper 120 resonates with the pulley 100 with a resonance frequency FR which is determined by the radial deformation of the resilient rubber member 121 and the mass of the damper-mass member 122, whereby bending vibrations are restrained.

When torsional vibrations are exerted from the crankshaft (not shown) to the damper pulley of the present embodiment, the pulley 100 vibrates in the circumferential direction thereof. Accordingly, the resilient rubber members 211 which are joined to both the side surfaces 114a to 114d of the projections 114 and the upright surfaces 122a to 122d of the damper-mass member 122 produce compression deformation, thereby generating a large spring force. Therefore, the resonance frequency $F\Theta$ of the dynamic damper 120 against the torsional vibrations becomes sufficiently high even where the inertia moment of the damper-mass member 122 is increased.

If the line connecting the symmetrical projections 114 with each other is in near agreement with the direction in which the bending vibrations are exerted from the crankshaft (not shown), the resilient rubber members 211 as well as the resilient rubber member 121 produce shear deformation against the bending vibrations, and accordingly, the spring force becomes small. Therefore, the resonance frequency FR against the bending vibrations is decreased.

In the embodiment illustrated in FIGS. 1 and 2, the sizes and angles of the damper pulley are set as follows: D1=110(cm), D2=51.4(cm), D3=108(cm), D4=53.4(cm), L0=30.2(cm), L1=10(cm), H=16.7(cm), $\Theta=15°$, $\Theta 1=20°$, $\Theta 2=3°$, $\Theta 3=3°$.

The data obtained for the damper pulley of the present embodiment is shown in Table 1.

Figure 3:
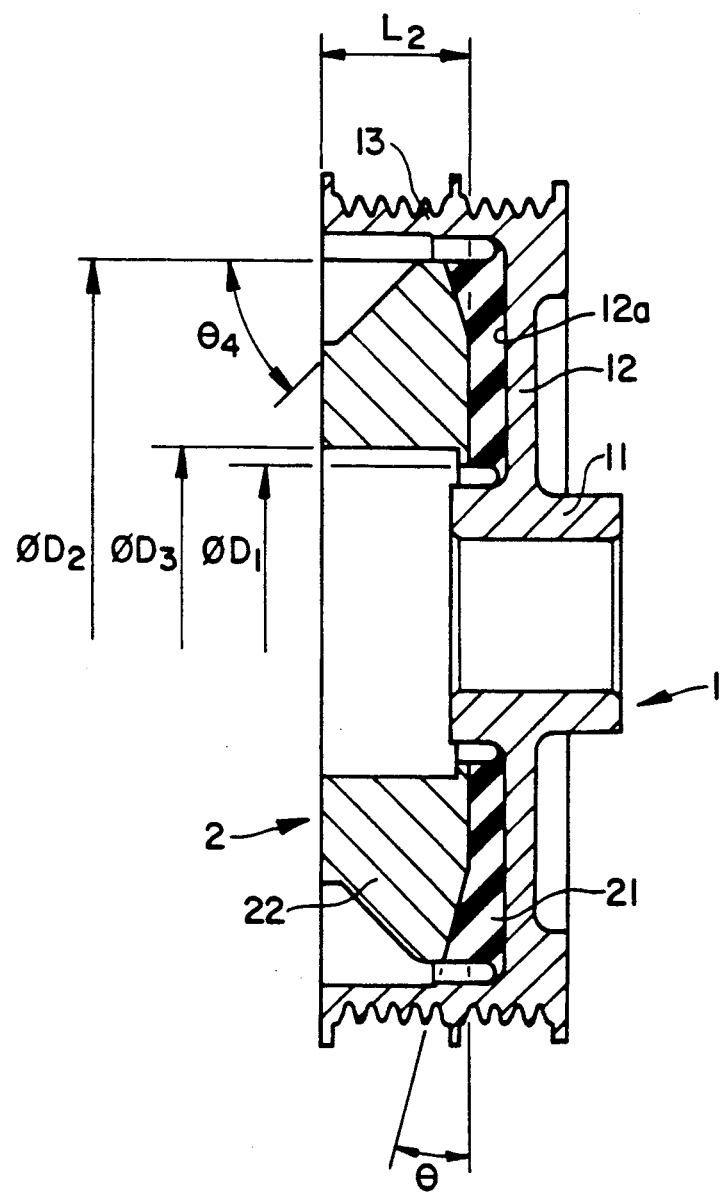
FIG. 3 is a longitudinal sectional view of a conventional damper pulley.

In Table 1, data for the conventional damper pulley illustrated in FIG. 3 is also provided for comparison.

The conventional damper pulley has sizes and angles identical to those of the damper pulley of the present embodiment with respect to common parts to each other. The parts of the conventional damper pulley different from those of the damper pulley of the present embodiment have the following size and angle:

TABLE I

| L2 = 24 (cm), $\Theta_4$ = 47.4° | | |
|---|---|---|
| | CONVENTIONAL DAMPER PULLEY | DAMPER PULLEY (PRESENT INVENTION) |
| INERTIA MOMENT | 0.01524 | 0.02063 |
| MASS | 0.000962 | 0.001145 |
| SPRING CONSTANT FORM FACTOR IN TORSIONAL DIRECTION | 1816 | 4186 |
| SPRING CONSTANT FORM FACTOR IN RADIAL DIRECTION | 109.2 | 116.6 |
| RESONANCE RATIO FR/F$\Theta$ | 0.976 | 0.708 |

INERTIA MOMENT: Kg · cm · sec$^2$
MASS: Kg · sec$^2$/cm
SPRING CONSTANT FORM FACTOR IN TORSIONAL DIRECTION: cm$^3$
SPRING CONSTANT FORM FACTOR IN RADIAL DIRECTION: cm As is apparent from Table 1, in accordance with the present embodiment, the preferable resonance ratio FR/F$\Theta$ of about 0.7 can be obtained even where the inertia moment is increased.

Furthermore, in the present embodiment, the resonance ratio FR/F$\Theta$ can be arbitrarily selected by changing the angles $\Theta 2$, $\Theta 3$ and the size H of the damper pulley.

In addition, the resonance ratio FR/F$\Theta$ can be also arbitrarily selected by inclining the line connecting the symmetrical projections with respect to the direction in which the bending vibrations are exerted.

In the present embodiment, an annular damper-mass member is used. However, the present invention is not limited to this embodiment. The damper-mass member may be composed of a plurality of arc-shaped members. In this case, each end surface of each arc-shaped damper-mass member serves as the upright surface which is perpendicular to the annular surface of the plate portion of the pulley.

In the present embodiment, each projection 114 has a fan-like shape and the thickness of each resilient rubber member 211 interposed between each projection 114 and each upright surface of the damper-mass member 122 gradually increases from the inner periphery to the outer periphery thereof. However, the present invention is not limited to the present embodiment. Rather, the thickness of each resilient rubber member 211 may be made equal or may be gradually decreased from the inner periphery to the outer periphery thereof.

Furthermore, the shape of each projection 114 is not limited to the fan-like shape. Instead, the triangular, rectangular or other suitable shape may be selected in accordance with the change in thickness of each resilient rubber member 211.

As described above, in accordance with the damper pulley of the present invention, the preferable resonance ratio can be obtained without any reduction in damping effect of the damper pulley, and accordingly, the torsional and bending vibrations exerted from the crankshaft or the like can be restrained.

While the invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A damper pulley comprising:
    a pulley having a boss portion and a plate portion formed around said boss portion; and
    a dynamic damper having a damper-mass member with an annular shape having a center of rotation common with said pulley, and a first resilient rubber member for joining said damper-mass member to an annular surface of said plate portion of said pulley,
    said damper-mass member having at least two fan-like concave portions with at least two positions that are symmetrical with respect to said center of rotation of said pulley, in a surface facing said annular surface of said plate portion of said pulley, each of said fan-like concave portions being defined by a pair of circumferentially facing upright surfaces that are perpendicular to said annular surface of said plate portion of said pulley,
    said pulley being provided with at least two projections which perpendicularly project from said annular surface of said plate portion into each of said at least two fan-like concave portions,
    side surfaces of each of said at least two projections, which circumferentially face said plate portion, are opposed to each of said circumferentially facing upright surfaces respectively, and
    a second resilient rubber member of a predetermined thickness being interposed between said pair of circumferentially facing upright surfaces of each of said concave portions and said side surfaces of each of said projections.

2. The damper pulley according to claim 1, wherein said side surface of each of said at least two projections and each of said circumferentially facing upright surfaces is disposed along radial lines branching out from said center of rotation of said pulley, and said second resilient rubber member has a thickness which gradually increases from the inner periphery to the outer periphery thereof by a predetermined angle.

3. The damper pulley according to claim 1, wherein said second resilient rubber member is disposed in a predetermined angular spacing, and has a predetermined thickness, which is different from those of a second resilience rubber member.

4. The damper pulley according to claim 1, wherein each of said at least two projections has a shape selected from the group consisting of a fan-like shape which fans out from said center of rotation of said pulley, a triangular shape, and a rectangular shape.

* * * * *